Dec. 31, 1946.   C. G. CRUZAN   2,413,314
COMPUTING DEVICE
Filed Jan. 15, 1946   4 Sheets-Sheet 1

INVENTOR.
Charles G. Cruzan
BY
M. O. Hayes
ATTORNEY

Dec. 31, 1946.                 C. G. CRUZAN                 2,413,314
                              COMPUTING DEVICE
                           Filed Jan. 15, 1946                4 Sheets—Sheet 3

INVENTOR.
Charles G. Cruzan
BY
M. O. Hayes
ATTORNEY

Dec. 31, 1946.   C. G. CRUZAN   2,413,314
COMPUTING DEVICE
Filed Jan. 15, 1946   4 Sheets-Sheet 4

INVENTOR.
Charles G. Cruzan
BY
M. O. Hayes
ATTORNEY

Patented Dec. 31, 1946

2,413,314

UNITED STATES PATENT OFFICE 2,413,314

COMPUTING DEVICE

Charles G. Cruzan, United States Navy

Application January 15, 1946, Serial No. 641,369

4 Claims. (Cl. 235—78)

(Granted under the act of March 3, 1883, as amended April 30, 1928; 370 O. G. 757)

This invention relates in general to a computing device and in particular to a computing device for correlating data indicating linear distance in terms of time intervals for sound transmission.

In copending application, Serial No. 634,875, filed December 13, 1945, by William C. Hodgson, and entitled "Sound locating and method and apparatus therefore," there is disclosed apparatus for locating the origin of a sound signal and expressing the location thereof in terms of a time differential which indicates the relative distance of the origin of such a time signal from each member of two pairs of spaced sound detecting units. In the simplest form of that invention, sound detecting units are placed at 90° intervals around a target center, and the origin of a sound signal such as, for example, a sound of a practice bomb falling from an airplane into the target area, is expressed on time interval indicators in terms of the time differential between the reception of the sound signal at a north and south time detecting unit, and in terms of the time differential between its reception at an east and south sound detecting unit.

In the above mentioned copending application, it is stated that a computing device may be devised for translating these time intervals directly in the distance and direction from the target center. It is an object of this invention to provide such a computing device.

It is another object of this invention to provide a computing device for correlating time differentials for sound detection at spaced positions with the distance and direction of the sound origin with respect to a fixed point.

It is an additional object of this invention to provide a computing device for quickly translating data representing time intervals of sound transmission into data directly locating the origin of a sound signal with respect to a fixed point.

Further objects and advantages of this invention, as well as its construction, arrangement and operation, will be apparent from the following description and claims in connection with the accompanying drawings, in which, Figure 1 is a plan view of one member of a computing device according to one embodiment of this invention.

Figure 1:
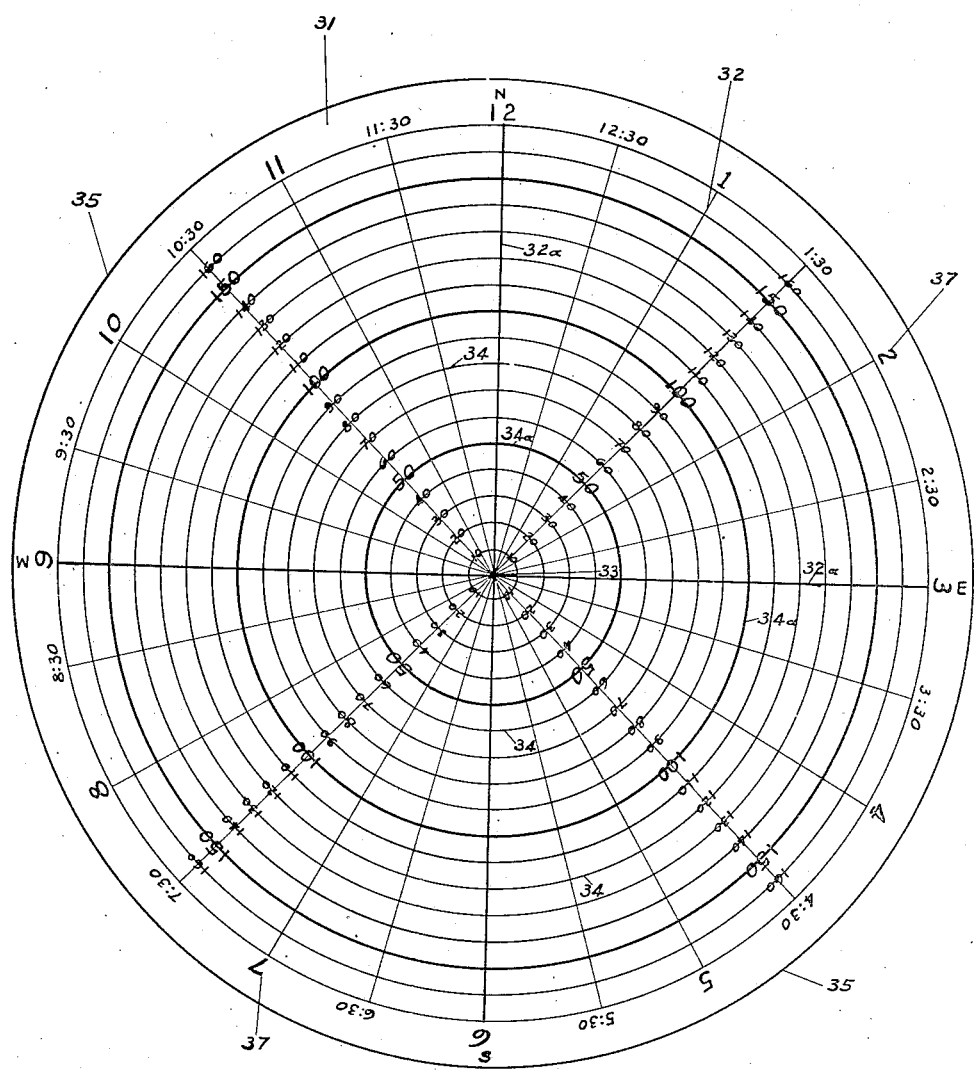

Referring to the figures in detail, in Figure 1 there is shown a disc-like member generally designated 31 which comprises for example a disc of heavy paper, cardboard, plastic, wood, metal, or the like, which has positioned on its front surface a series of markings and indications as follows: A series of radial lines or markings 32 extend outwardly at even angularly intervals from the center 33 of the disc 31. In the particular form of the invention shown in Figure 1 there are twenty-four of these radial lines 32 separated, of course, by 15° intervals. These lines 32 are numbered either in degrees from zero to 360 or any other convenient numbering which may be specifically adapted for this purpose. In the presently preferred form of this invention, these radial lines 32 are numbered to resemble the dial of a clock namely in half hour intervals up to twelve.

Positioned concentrically around the center 33 are a series of circular markings 34 which preferably are equally spaced and cover the area from the center 33 substantially to the edge of the disc 31.

The concentric lines 34, 34a are numbered according to a convenient scale, for example as shown in Figure 1 in units ten from 10 to 160, this scale as will be set forth hereinafter being a direct representation of a correct reading in linear feet.

For the purposes of clarity, various of lines 34a, for example every fifth line, may be darker or otherwise emphasized, whereby a reading therealong may more readily be made. Likewise, if desired, the vertical and horizontal radial lines 32a may be emphasized for clarity.

Figure 2:
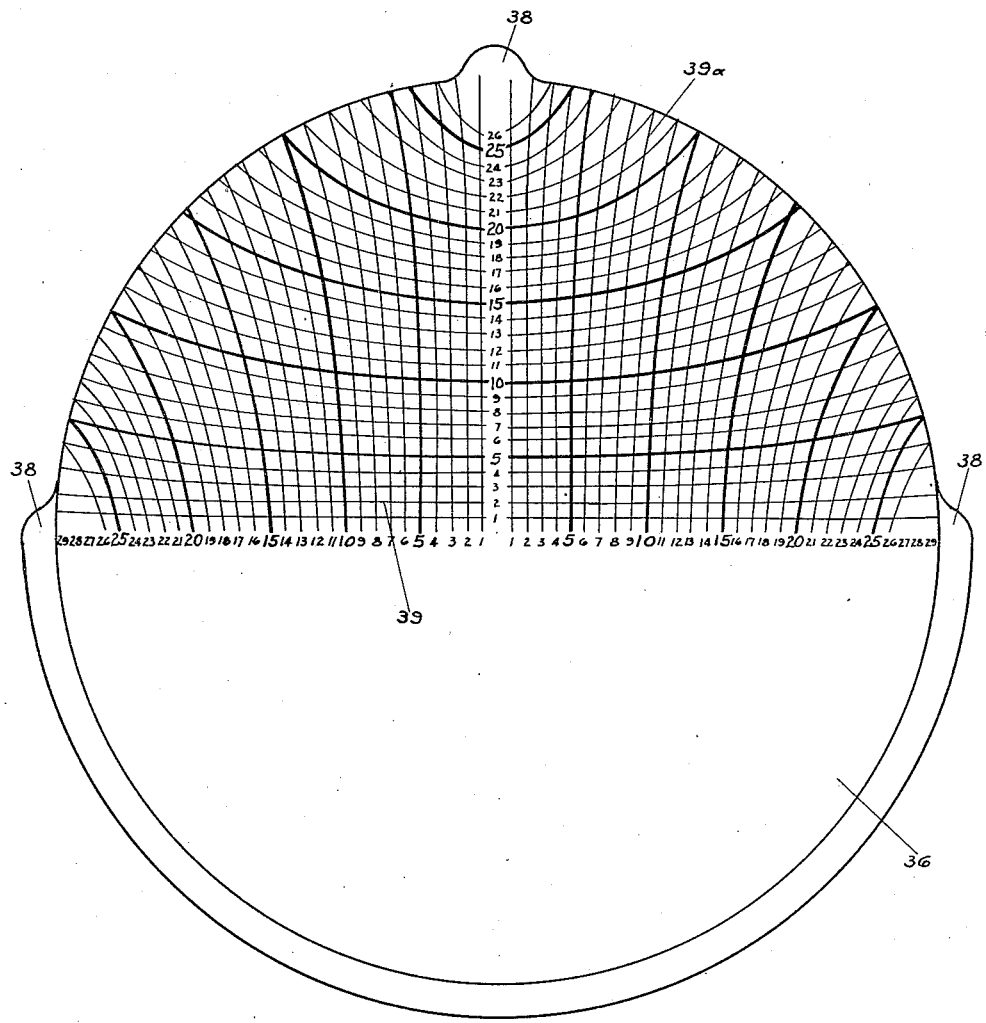
Figure 2 is a plan view of a second member of a computing device adapted to be rotatably superposed on the member shown in Figure 1.

Figure 2 shows another disc-like member 36 which is adapted to be rotatably positioned on disc 31 for example by means of a pivot pin 52 (refer to Figure 5) passing through the center 37 of disc 36 and through the center 33 of disc 31. This disc 36 is preferably manufactured of a relative transparent material such as, for example, a clear plastic or the like whereby the markings and indications on disc 31 may be viewed and read through disc 36. Any conventional transparent material may be used for this purpose; a highly satisfactory material is a relatively thin sheet of cellulose acetate.

Positioned at 90° intervals around the edge of disc 36 at two or more points and optionally at three points are quadrant indicators 38 which according to the form of the invention shown in Figure 2 may be lobes extending beyond the edge of the disc and integrally secured to the disc. It is to be understood, of course, that these indicators may be other marking means such as, for example, distinctive marks on the surface of disc 36; however, as will be disclosed hereinafter these lobes 38 also serve as handles whereby disc 36 can be rotated with respect to disc 31 and therefore serve an additional variable purpose. Since all readings will be taken within one half of disc 36 as will be set forth hereinafter and optionally even within one fourth thereof, it is sufficient to have three or if desired only two of these lobes; for example, in the disc shown in Figure 2, the entire lower half of the disc 36 is free from markings and accordingly is not provided with lobes 38; thereby this disc is adapted to receive further operating features which may be positioned on this blank lower half of the disc 36.

On at least one quarter of the face of disc 36 between a pair of quadrant markers 38 and preferably on one half of the face of disc 36 extending between diametrically opposite markers 38 are a series of lines or indicating marks 39 running across the disc in curves representing algebraic equations. Likewise, there is another series of lines or indicating marks 39a running generally in a vertical direction and representing a series of algebraic equations. These lines or markings 39 and 39a are so positioned on disc 36 that they are adapted to cooperate with the markings 32 and 34 on disc 31 to convert various data such as, for example, testing data directly into a reading on disc 31.

According to one simple form of the invention for which a computer shown in the figures specifically designed, there are obtained data comprising two numbers, each being a time differential in hundreds of a second, one of which represents the time differentials between the reception of a sound signal at two sound detecting units located on diametrically opposite sides of a target area, the other member being a similar time differential between the reception of the same signal by two sound detecting units located on diametrically opposite sides of the target area and separated from the first sound detecting units by 90°. By mathematical derivation it can be shown that there is a hyperbolic relationship between the two members and the location of the origin of the sound signal with respect to the center of the area. Specifically it can be shown mathematically that with the conditions set forth hereinabove the line 39 will follow the general equation $$Y^2(16A^2-4K^2)-4K^2X^2=4A^2K^2-K^4$$

where X and Y conventionally represent units along the horizontal and vertical axis, where A is a ratio between the speed of sound at the test temperature and the distance from each sound receiving unit to the center of the target area, and where K is an arbitrarily varying known quantity, the separation between the series of lines being determined by the various arbitrary values set for K.

Likewise the lines 39a follow a similar general equation.

$$X^2(16A^2-4K^2)-4K^2Y^2=4AK^2-K^4$$

where the letters have the same significance as in the previous equation.

The various lines 39 and 39a are numbered, for example in hundreds of a second, according to a scale of values which corresponds to the scale used for lines 34 in Figure 1.

It will be seen that each of lines 39 represents graphically and in a convenient scale the locus of a point from which a sound signal will travel to sound detecting units positioned on the Y axis, with an arbitrarily selected, constant time differential between its reception at such sound detecting units. Likewise, lines 39a similarly represent loci of points with relation to sound detecting units located on the X axis.

Accordingly the intersections of lines 39 and 39a on disc 36 provide a graphical location of the origin of sound signals and the projection of these intersections onto disc 31 provide suitable scale and direction readings for the graphical locations.

The derivation of the correct equations which have been set forth hereinabove is a matter of relatively simple mathematics and is well within the skill of a trained mathematician; therefore, it is believed to be unnecessary to set forth the derivation herein. Similarly the assigning of correct values to K and the drawing of the correct equation lines is also within the skill of a trained mathematician and need not be set forth in detail.

In the preferred form of the invention as shown in Figure 2, these lines 39 and 39a are positioned only on one half of disc 36 leaving the other half substantially blank. This permits the convenient placing of other computing members in this blank space, or alternatively the printing of working directions or the like thereon.

Figure 3:
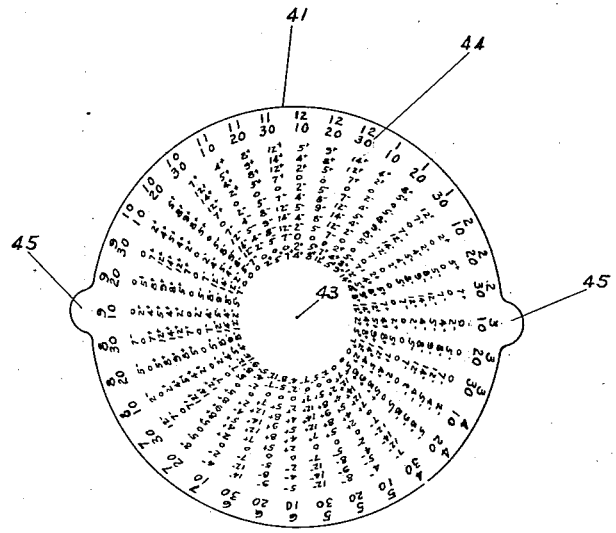
Figure 3 is a plan view of one member of a wind correction computer which is adapted to be used with the device shown in Figures 1 and 2 according to another embodiment of this invention.
Figure 4:
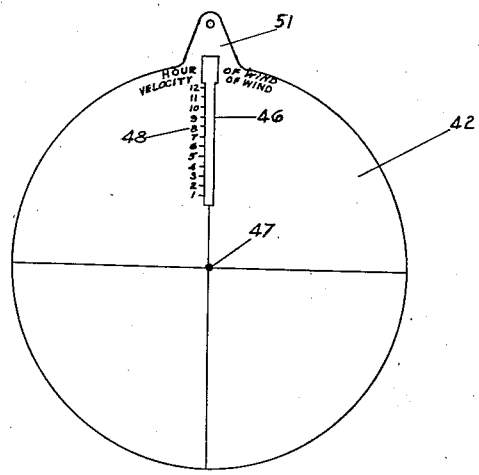
Figure 4 is a plan view of a second member of wind correction computer adapted to be superposed on the member shown in Figure 3.

According to one form of this invention there is provided a correcting device which substantially nullifies errors caused by wind blowing across the target area. Since the velocity of the wind may be not negligible with respect to the velocity of the sound in air, it is possible that there may be produced a noticeable error in the location of the origin of the sound signal as determined by this computer. Such an error however may be substantially eliminated by a simple auxiliary computing device as shown in Figures 3 and 4. The elimination of this error depends partly on a rough estimation and accordingly the error is not completely eliminated; however, it will be reduced to so low a value that it may properly be ignored.

The auxiliary computer comprises in general a disc 41 shown in Figure 3 and disc 42 shown in Figure 4. The disc 41 contains a series of columns of figures 44 radially positioned around the center 43 of the disc. The outermost of these figures represents the angle from which the wind is coming, for example in terms of positions on a clock dial, namely, from one o'clock to 12 o'clock. The next figure represents the approximate velocity of the wind, and the subsequent figures, reading toward the center, represent various correction factors with appropriate positive and negative values to be added to the principal reading for various directional locations of the sound signal origin with respect to the center of the target area. Optionally mounted on the disc 41 are lobes or handle members 45 which may be used to rotate the disc.

In Figure 4 there is shown a disc 42 having a slot or opening 46 extending from the center toward one edge of the disc. Along the outer end of this slot are positioned headings "hour of wind," "velocity of wind" which are so positioned that they correspond with the position on the slot where the two outer figures from disc 41 appear through the slot. Between this point and the center 47 along the slot 46 are positioned a series of numbers 48 indicating the angular position of the sound origin with respect to the center of the target area each of these numbers having a corresponding one of the numbers 44 of disc 41 appearing through slot 46 adjacent to it.

Disc 42 is adapted to be rotatably positioned against disc 41, for example by means of a pivot pin 47 which passes through the centers of discs 41 and 42 which is mounted on disc 36. Optionally a tag 51 is provided on disc 42, by which this disc may also be secured to the pivot pin 52 which rotatably mounts together discs 31 and 36. In this way for convenience disc 42 is secured in a fixed position with respect to disc 36 and disc 41 is secured beneath disc 42 rotatable with respect to disc 42 and also with respect to disc 36.

Figure 5:
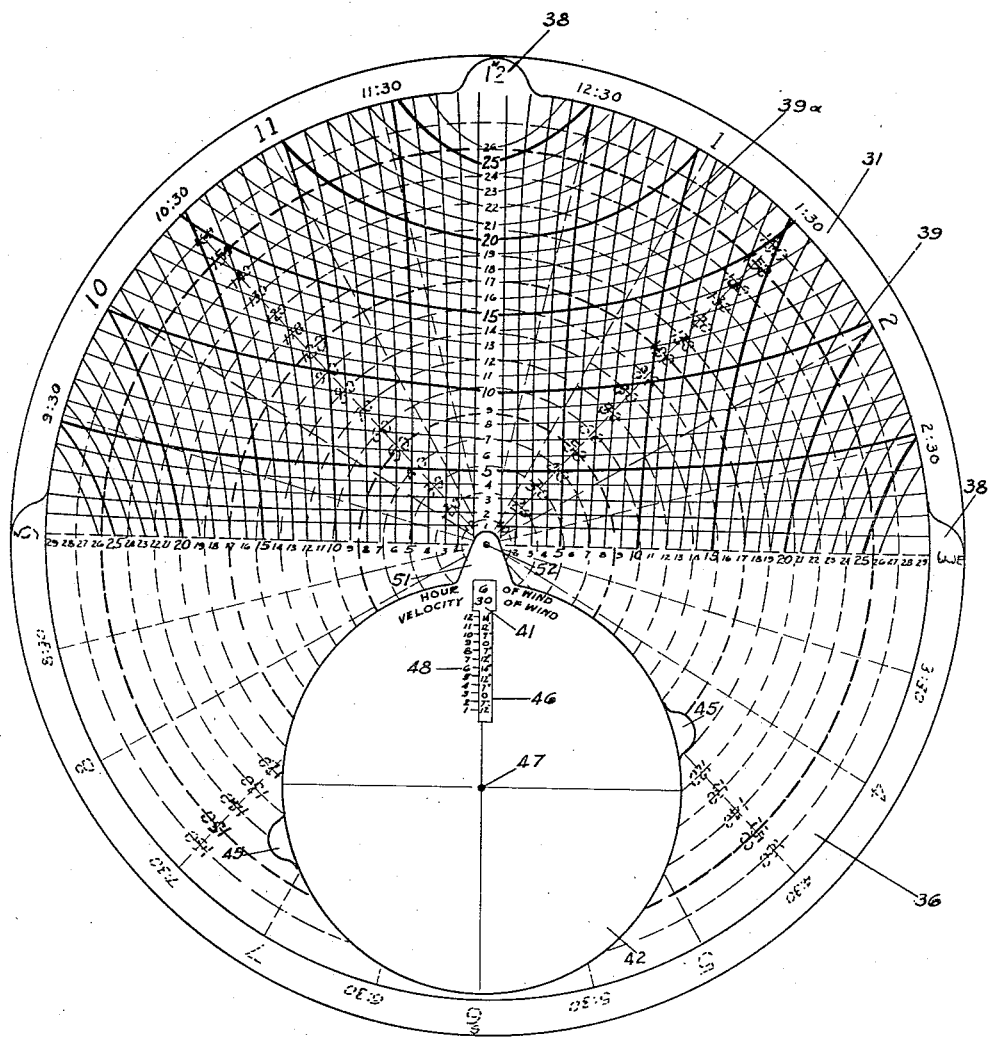
Figure 5 is a plan view of the assembled computer according to Figures 1 to 4.

In Figure 5 the assembled computing device comprising disc 31 and 36, 41 and 42 is shown, illustrating the relative positions of the various discs. The correlation between the various parts is clearly brought out in this figure.

The use and operation of this computing device has been substantially set forth in connection with the description thereof. However, for the sake of greater clarity, the operation of the device in connection with simple data will be presented, with reference to the position of the device as shown in Figure 5. For this purpose it will be assumed that a reading has been obtained in the sound detecting system previously described indicating that the sound signal was received in a north sound detecting unit 0.08 second before its reception in the opposite or south sound detecting unit. Similarly, the sound signal was received by an east sound detecting unit 0.18 second prior to its reception in the west sound detecting unit. There is a wind of 30 knots velocity coming from the 6 o'clock direction.

Two lobes 38 are positioned respectively in the 12 o'clock and 3 o'clock positions with respect to the readings on disc 31. The line 39 numbered 8 along the Y axis is followed to the right until it crosses the line numbered 18 on the X axis whereby there is obtained the point of interception between the lines corresponding to 0.08 north and 0.18 east. Reading through transparent disc 36 on disc 31 there is obtained a reading of about 132 feet and a direction of about 2 o'clock, thereby indicating that the sound signal bore that numerical relation to the center of the target area. On the wind correction computer the numbers 6 hours of wind and 30 knots velocity of wind are positioned in slot 46, and opposite the number 2 (numbered 48 in Figure 4) which is the angular position of the sound signal appears the correction factor −7 to be added to the reading of 132 feet, to give a more accurate distance of 125 feet. The error in direction due to wind velocity is ignored.

It will be obvious that numerous variations may be made in this invention for example to adapt the computing device for various locations of sound receiving units. For example, the device may be adapted to operate with sound receiving units which are positioned at other than 90° angles with respect to each other, likewise to operate with varying numbers of sound receiving units, and obviously with varying distances between units as well as with varying velocities such as, for example, the velocity of sound through water or the like.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A computing device comprising a disc having a plurality of spaced radial markings and a plurality of spaced concentric markings on one face thereof, a transparent disc rotatably positioned against said face and having thereon a series of markings which are mathematical curves representing the loci of the origin of a sound signal with respect to sound detecting units for a series of arbitrarily selected time differentials between the reception of said sound signal by one sound detecting unit and its reception by another sound detecting unit.

2. A computing device comprising a disc having a plurality of spaced radial markings and a plurality of spaced concentric markings on one face thereof, a transparent disc rotatably positioned against said face and having thereon a series of markings which are mathematical curves according to the formulae $$Y^2(16A^2-4K^2)-4K^2X^2=4A^2K^2-K^4$$

and $$X^2(16A^2-4K^2)-4K^2Y^2=4A^2K^2-K^4$$

where X represents units along the horizontal axis, Y represents units along the vertical axis, and K represents, in turn, a plurality of members of a series of arbitrarily selected constants and A is a constant.

3. A computing device comprising a disc having a plurality of spaced radial markings and a plurality of spaced concentric markings on one face thereof, a transparent disc rotatably positioned against said face and having thereon a series of markings which are mathematical curves representing the loci of the origin of a sound signal with respect to sound detecting units for a series of arbitrarily selected time differentials between the reception of said sound signal by one sound detecting unit and its reception by another sound detecting unit, a disc positioned on one of said previously mentioned discs and having a series of radial columns of numerals representing direction of wind, velocity of wind and a series of correction factors, and another disc rotatably positioned with respect to said last mentioned disc and having thereon a column of numbers representing the angular position of the origin of said sound signal with respect to a fixed point, said radially positioned correction factors being located to correspond, each column in turn, with said numbers representing the angular position of the sound signal.

4. A computing device comprising a disc having a plurality of spaced radial markings and a plurality of spaced concentric markings on one face thereof, a transparent disc rotatably positioned against said face and having thereon a series of markings which are mathematical curves according to the formulae $$Y^2(16A^2-4K^2)-4K^2X^2=4A^2K^2-K^4$$

and $$X^2(16A^2-4K^2)-4K^2Y^2=4A^2K^2-K^4$$

where X represents units along the horizontal axis, Y represents units along the vertical axis, and K represents, in turn, a plurality of numbers of a series of arbitrarily selected constants and A is a constant, a disc positioned on one of said previously mentioned discs and having a series of radial columns of numerals representing direction of wind, velocity of wind and a series of correction factors, and another disc rotatably positioned with respect to said last mentioned disc and having thereon a column of numbers representing the angular position of the origin of said sound signal with respect to a fixed point, said radially positioned correction factors being located to correspond, each column in turn, with said numbers representing the angular position of the sound signal.

CHARLES G. CRUZAN.